Patented Sept. 13, 1949

2,481,805

UNITED STATES PATENT OFFICE 2,481,805

PENICILLIN-PECTIN COMPOSITIONS

Barron Silvin Whittingham, New York, N. Y., assignor, by direct and mesne assignments, to Biotic Research Institute, Inc., New York, N. Y., a corporation of New York No Drawing. Application March 19, 1945, Serial No. 583,644

7 Claims. (Cl. 260—302)

The present discovery relates particularly to penicillin-pectin compositions, the main object having been and the results accomplished being the production of antibiotic or penicillin compounds which can be administered orally with unprecedented results.

With this discovery, as will be set forth in detail later on, I have successfully prepared and tested a stable penicillin preparation for oral administration.

It is well known that penicillin and its salts are unstable at room temperature, and therefore must be kept under refrigeration to maintain their anti-biotic activity for a given period; secondly, penicillin is excreted so rapidly from the blood stream that it requires large dosages of penicillin to maintain an appreciable therapeutic level by parenteral administration.

It is therefore, the object of this invention or discovery, to produce a preparation of a stable penicillin which when 100,000 units is given orally will maintain therapeutic blood levels from 1.25 units or higher per cubic centimeter of blood from the first hour to .04 units of penicillin per cubic centimeter of blood to the eighth hour inclusive. This preparation need not be given to controlled stomachs but may be given to stomachs with or without food.

This compound is stable as it was placed in capsules and kept at room temperature for from 6 to 8 months without an appreciable loss of activity. Further, it was incubated at 98.6° Fahr., in a gastric juice solution and adjusted with hydrochloric acid to simulate the exact or precise conditions of an average stomach for over 4 hours, and when tested, the preparation showed no appreciable loss of activity. A further test of this preparation in distilled water at 65° Cent., for 24 hours showed an activity of from 90 to 95% of the original units.

Since I do not know the exact formula for penicillin, the following examples will illustrate how the stable compound is prepared either as a mixture, a conjugation or one in which a reaction takes place.

The commercial grade of sodium salt of penicillin is mixed, conjugated or reacted with an hexuronic acid, particularly either the mono-, di- or tetra-galacturonic acid as prepared from pectin by hydrolysis.

Pectin is regarded as a compound composed of tri-acetyl - arabino - galacto - dimethoxy - tetra-galacturonic acid (see, for example, "Pectin, Its Manufacture, Properties and Uses," page 34, compiled by William E. Elwell, published by Belle Reeves, Secretary of the State of Washington, January, 1939). It is known by this reference that this compound can be so hydrolysed so as to break down the pectin molecule to galacturonic acid with a low methoxy group attached to either the mono-, di- or tetra-galacturonic acid in such a way as to constitute a major part of the resulting hydrolytic compound.

When this hexuronic acid produced by mild hydrolysis of pectin as described in the preceding paragraph is mixed, reacted or conjugated with the sodium salt of penicillin and lyophilized, a stable and powdered preparation is achieved, or it may be stablized in solution form.

In order that my discovery may be more fully understood and its meaning to mankind known, attention is invited to the following examples, viz:

Example I

To 100,000 units of penicillin sodium 10 cc. of 3% galacturonic acid as prepared from pectin is mixed at room temperature after adjusting the pH to 6.3 to 6.4; and then lyophilized to render a stable composition suitable for oral administration.

Example II

When the hexuronic acid of low methoxy content as prepared from pectin is adjusted to pH points from 5.5 to 7.5, and 10 cc. of this 3% material is mixed, conjugated or reacted with 100,000 of the salts of penicillin or derivatives of penicillin, and then lyophilized, a stable composition is prepared, and which is suitable for oral and topical uses of active antibiotic principles.

Example III

When galacturonic acid as prepared from pectin and pectous compounds as described above adjusted with sodium hydroxide to a pH of 7.0; and if 5 cc. of a 3% solution of this acid is mixed, reacted or conjugated with 50,000 units or less of the salts of penicillin, and then lyophilized, a stable powder is prepared having an anti-biotic activity suitable for oral administration.

From the foregoing description and examples, it is apparent that by these methods and the use of the set forth materials, a stable penicillin suitable for oral administration has been discovered, and that set forth in examples may be administered topically.

It is also apparent that the powder compound made according to this discovery even in capsule form will retain its anti-biotic activities for considerable time at normal temperatures, the present instances being from 6 to 8 months; and further that the gastric juice of the stomach has practically no destructive effect upon the compound, which may be administered orally with normally fed or empty stomachs with equally satisfactory results.

While examples of the various acids derived from pectin or pectous compounds have been given above as 3% solutions, I do not confine myself to any percent and compounds may be made from infinitesimal amounts up to 100%.

I do not confine myself to the dried or lyophilized form of compound. The compounds may be made in liquid form with suitable solvent generally aqueous. It is further to be understood that in the administration of my compounds they may be given either in liquid or dry form and that in all cases it is not necessary to dry.

What is claimed is:

1. An anti-biotic composition for oral or topical administration composed of a salt of penicillin and a stabilizing agent containing mono-, di- or tetra-galacturonic acids as prepared from pectin by hydrolysis.

2. An anti-biotic composition as claimed in claim 1 in which the compound is lyophilized and made in powder form and in which state it will remain stable at normal temperatures.

3. An anti-biotic composition as claimed in claim 1, in which the stabilizing agent is taken from the group of hexuronic acids consisting of galacturonic acid, the mono-, di- and tetra-galacturonic acids as prepared from pectin.

4. As a new material for therapeutic uses, the product resulting from the mixture of salts of penicillin with a solution of a hydrolyzed product of pectin.

5. As a new material for therapeutic uses, the product resulting from the mixture of salts of penicillin with a solution of a hydrolyzed product of pectin, when lyophilized.

6. The method of preparing a new therapeutic material which comprises hydrolyzing a pectin product and mixing the hydrolyzed product with a salt of penicillin.

7. The method of preparing a new therapeutic material which comprises mixing hydrolized pectin with a salt of penicillin and lyophilizing the resulting product.

BARRON SILVIN WHITTINGHAM.

REFERENCES CITED

The following references are of record in the file of this patent:

UNITED STATES PATENTS

| Number | Name | Date |
|---|---|---|
| 2,022,464 | Hall | Nov. 26, 1935 |
| 2,283,531 | Briod | May 19, 1942 |
| 2,321,400 | Lubarsky | June 8, 1943 |
| 2,330,950 | Olsen et al. | Nov. 9, 1943 |

OTHER REFERENCES

Bulletin of National Formulary Comm., Oct. 1940, pp. 9, 10, 3.

Lancet, Dec. 11, 1943.

Physician's Bulletin, Jan.-Feb. 1944, (issued by Eli Lilly & Co.), pages 7 (167—65 P).